(12) United States Patent
Lee et al.

(10) Patent No.: US 8,743,856 B2
(45) Date of Patent: Jun. 3, 2014

(54) WIRELESS CHARGING OF MOBILE DEVICE

(75) Inventors: Jungseok Lee, Gyeonggi-Do (KR);
Hyunok Lee, Seoul (KR); Sangmo Park, Seoul (KR); Seonghyok Kim, Seoul (KR); Giwon Kang, Seoul (KR); HyeonChang Choi, Gyeonggi-Do (KR); Hongjo Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 252 days.

(21) Appl. No.: 13/276,979

(22) Filed: Oct. 19, 2011

(65) Prior Publication Data
US 2012/0214418 A1 Aug. 23, 2012

Related U.S. Application Data

(63) Continuation-in-part of application No. 13/042,380, filed on Mar. 7, 2011.

(60) Provisional application No. 61/445,975, filed on Feb. 23, 2011.

(51) Int. Cl.
*H04B 7/216* (2006.01)
*H04B 1/38* (2006.01)

(52) U.S. Cl.
USPC .......................................... 370/342; 455/573

(58) Field of Classification Search
USPC .................. 370/342; 455/522, 573
See application file for complete search history.

(56) References Cited

U.S. PATENT DOCUMENTS 8,358,108 B2 * 1/2013 Seman et al. ................. 320/134
8,412,861 B2 * 4/2013 Kim ................................ 710/15
2011/0021142 A1 * 1/2011 Desai et al. .................. 455/41.2
2011/0148349 A1 * 6/2011 Kim et al. .................... 320/108
2011/0156640 A1 * 6/2011 Moshfeghi .................... 320/108

FOREIGN PATENT DOCUMENTS

| CN | 101728850 | 6/2010 |
|---|---|---|
| WO | 2008/038057 | 4/2008 |

OTHER PUBLICATIONS

The State Intellectual Property Office of the People's Republic of China Application Serial No. 201210042914.5, Office Action dated Mar. 3, 2014, 10 pages.

* cited by examiner

*Primary Examiner* — Man Phan
*Assistant Examiner* — Ryan Kavleski
(74) *Attorney, Agent, or Firm* — Lee, Hong, Degerman, Kang & Waimey

(57) ABSTRACT

Systems, circuits, and devices for wirelessly charging a mobile device are disclosed. In one embodiment, a system of a mobile device comprises a low power PAN module and a controller for the low power PAN module configured to monitor a connection request signal communicated from an external device while the mobile device is in a sleep mode, where the controller is supplied with quiescent current from a battery of the mobile device during the sleep mode. In addition, the system comprises an AP of the mobile device configured to wake up from the sleep mode when the connection request signal is validated by the controller, forward to the external device an equipment identity data of the mobile device and a charging status of the battery, and charge the battery of the mobile device with energy received from a wireless charging module associated with the external device.

19 Claims, 10 Drawing Sheets

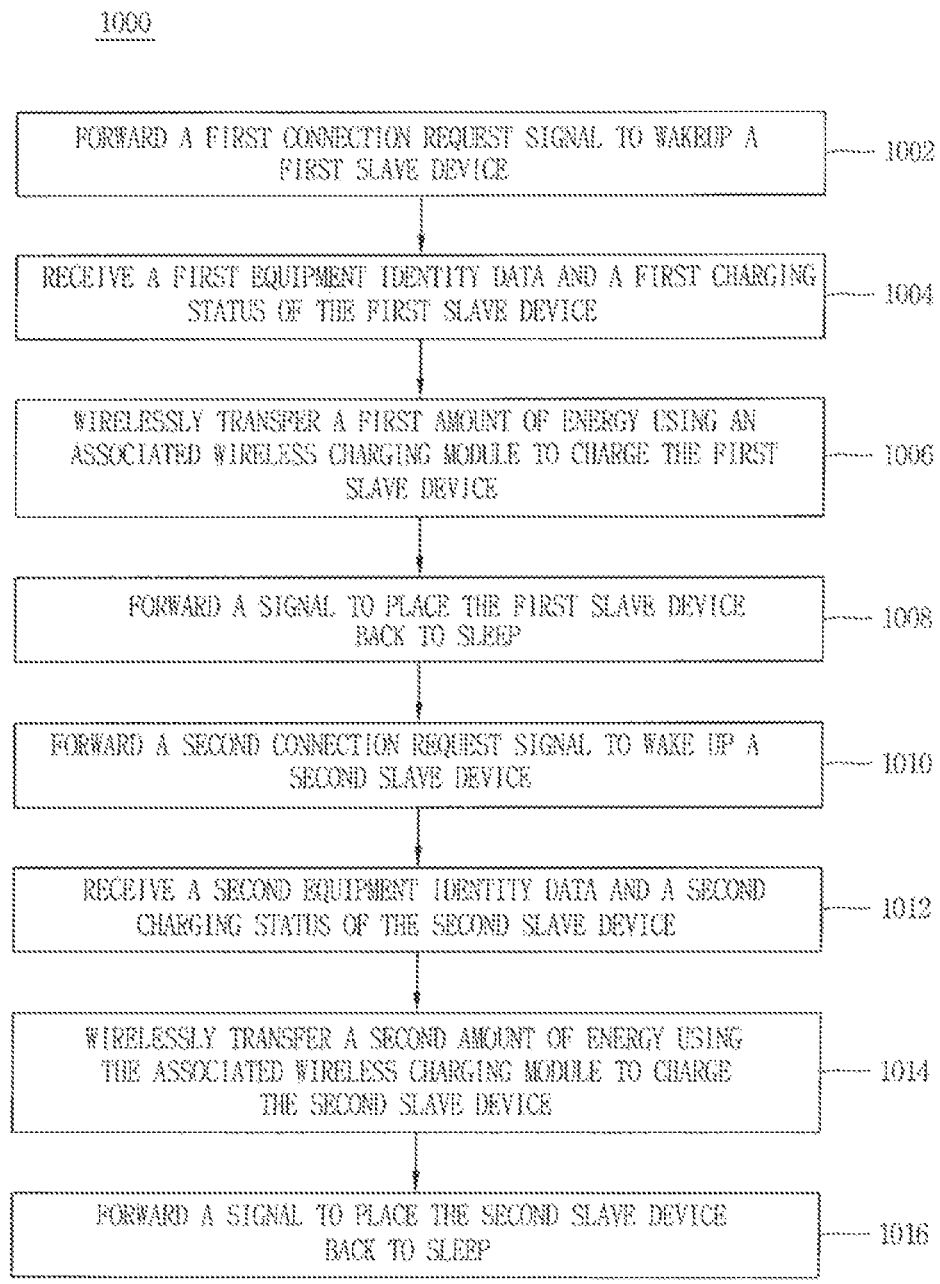

WIRELESS CHARGING OF MOBILE DEVICE

CROSS-REFERENCE TO RELATED APPLICATIONS

This application is a continuation-in-part application of U.S. patent application Ser. No. 13/042,380, filed on Mar. 7, 2011, which pursuant to 35 U.S.C. §119(e), claims the benefit of priority to U.S. Provisional Patent Application Ser. No. 61/445,975, filed on Feb. 23, 2011, the contents of which are hereby incorporated by reference herein in their entirety.

TECHNICAL FIELD

Embodiments of the disclosure generally relate to the field of electronics, and more particularly to control systems, circuits, and devices.

BACKGROUND

A mobile device is a pocket-sized computing device, typically having a display screen with touch input and/or a miniature keyboard. Some of the types of the mobile device include a mobile phone, a personal digital assistant (PDA), a tablet PC, a laptop, etc. As today's mobile devices become ever more dependant on their software, as in the case of smart phones, software upgrade to fix bugs or enhance the features of the mobile devices is becoming increasingly frequent. For example, companies are offering new versions of the smart phones twice year, where the new versions may have new and/or upgraded software and/or hardware features. The upgraded smart phones may be packaged and stored as an inventory until they are shipped out and sold to the consumers.

However, while the smart phones are in stock, a bug or flaw may be found with a certain software feature of the smart phones, such as the OS of the smart phones. In that case, the companies may manually take out the smart phones from their package, power up the application processor (AP) of each mobile phone, and then download a bug-free OS to each mobile phone.

SUMMARY

This summary is provided to comply with 37 C.F.R. §1.73, requiring a summary of the disclosure briefly indicating the nature and substance of the disclosure. It is submitted with the understanding that it will not be used to interpret or limit the scope or meaning of the claims.

Systems, circuits, and devices for wirelessly charging a mobile device are disclosed. In one aspect, a system of a mobile device for wirelessly charging a mobile device comprises a low power personal area network (PAN) module configured to wirelessly communicate with an external device for establishing a connection with the external device and a controller for the low power PAN module configured to monitor a connection request signal communicated from the external device via the low power PAN module while the mobile device is in a sleep mode, where the controller is supplied with quiescent current from a battery of the mobile device during the sleep mode. In addition, the system comprises an application processor (AP) of the mobile device configured to wake up from the sleep mode when the connection request signal is validated by the controller, forward to the external device an equipment identity data of the mobile device and a charging status of the battery, and charge the battery of the mobile device with energy received from a wireless charging module associated with the external device.

In another aspect, a method of a master device for charging multiple slave devices comprises forwarding a first connection request signal to a first slave device of the multiple slave devices to wake up a first AP of the first slave device, where the first slave device is supplied with quiescent current from a first battery of the first slave device prior to the wake up of the first AP. The method also comprises receiving a first equipment identity data of the first slave device and a first charging status of the first battery, and wirelessly transferring a first amount of energy using a wireless charging module associated with the master device to charge the first slave device based on the first equipment identity data and the first charging status. The method further comprises receiving the first charging status of the first battery, forwarding a first termination signal to terminate the charging of the first battery when the first charging status indicates that a level of the first battery has reached a first threshold, and forwarding a first AP OFF signal to place the first AP to sleep when the level of the first battery reaches the first threshold. Moreover, the method comprises forwarding a second connection request signal to a second slave device of the multiple slave devices to wake up a second AP of the second slave device, where the second slave device is supplied with quiescent current from a second battery of the second slave device prior to the wake up of the second AP. The method also comprises receiving a second equipment identity data of the second slave device and a second charging status of the second battery, and wirelessly transferring a second amount of energy using the wireless charging module to charge the second slave device based on the second equipment identity data and the second charging status. The method further comprises receiving the second charging status of the second battery, forwarding a second termination signal to terminate the charging of the second battery when the second charging status indicates that a level of the second battery has reached a second threshold, and forwarding a second AP OFF signal to place the second AP to sleep when the level of the second battery reaches the second threshold.

Other features of the embodiments will be apparent from the accompanying drawings and from the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which:

FIG. 10 illustrates a process flow chart of an exemplary method of a master device for wirelessly charging a slave device, according to one embodiment.

Figure 1:
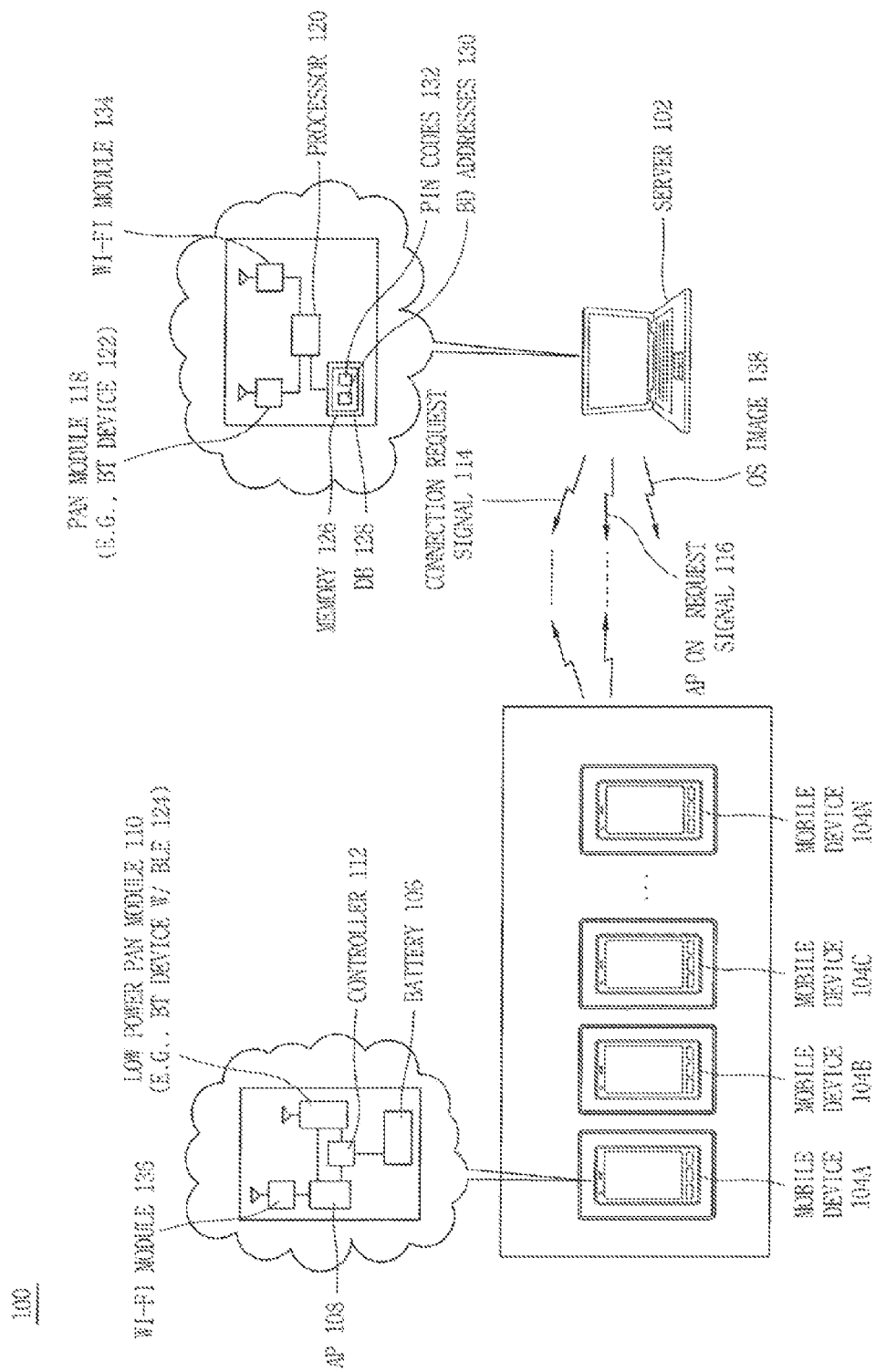
FIG. 1 illustrates an exemplary system for remotely waking up an application processor of a mobile device, according to one embodiment.

Other features of the present embodiments will be apparent from the accompanying drawings and from the detailed description that follows. Further, the drawings described herein are for illustration purposes only and are not intended to limit the scope of the present disclosure in any way.

DETAILED DESCRIPTION

A method, device and/or system are disclosed that wirelessly charge one or more mobile devices. According to embodiments of this disclosure, a system of a mobile device for wirelessly charging a mobile device includes a low power personal area network (PAN) module and a controller of the low power PAN module, where the system is supported by a battery of the mobile device for several months. The long battery life of the mobile terminal may be possible by maintaining the mobile device in a sleep mode, where minimal amount of power is drawn from the battery during the sleep mode. While the system is in the sleep mode, the controller of the system, while the application processor (AP) as well as other major power-consuming components of the mobile device is in the sleep mode, may monitor a signal from an external device so that it can turn on the AP in response to an AP on request signal when the external device is verified.

The mobile device with the system for wirelessly charging the battery of the mobile device may process the AP on request signal to turn on the AP. Then, with its AP on, the mobile device may carry out a task commanded by the external device through the low power PAN module or more powerful communication means available in the mobile device, such as wireless LAN module (e.g., a Wi-Fi module). That is, according to the embodiments of this disclosure, the monitoring and activating the AP of the mobile device may be performed using a low power PAN module, such as a Bluetooth (BT) Device with Bluetooth Low Energy (BLE) feature, so that the battery installed on the mobile device which is in package can last longer, or the AP can activate more powerful communication means, such as the Wi-Fi module available on the mobile device, to process data or files from the external device. In one exemplary implementation, the mobile device charges its battery using energy generated and/or forwarded by a wireless charging module, such as an inductive resonance pad, where the wireless charging module may be a part of the external device or a separate entity. Once the battery charging is completed, the AP of the mobile device can be placed back to sleep, and the mobile device may remain in the sleep mode until a next task is commenced by an external device.

Further, according to the various embodiments of the present disclosure, a single wireless charging module may be used to charge multiple mobile devices. In one exemplary implementation, a master device controlling the wireless charging module (e.g., the inductive resonance pad) may be operated to serially charge multiple mobile devices by waking up the mobile devices one at a time, receiving the equipment IDs, the charging status data, and/or the battery capacity data of the mobile devices, and charging the mobile devices according to the order they are turned on. Thus, the automatic and efficient charging system and method may provide a more efficient and cost effective way of maintaining the mobile devices.

Reference will now be made in detail to the embodiments of the disclosure, examples of which are illustrated in the accompanying drawings. While the disclosure will be described in conjunction with the embodiments, it will be understood that they are not intended to limit the disclosure to these embodiments. On the contrary, the disclosure is intended to cover alternatives, modifications and equivalents, which may be included within the spirit and scope of the disclosure. Furthermore, in the detailed description, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure aspects of the present disclosure.

FIG. 1 illustrates an exemplary system 100 for remotely waking up application processors of mobile devices 104A-N, according to one embodiment. In one embodiment, the system 100 comprises a server 102 and the multiple mobile devices 104A-N. It is appreciated that the server 102 may be a work station, a desktop, a laptop, a tablet PC, etc. which functions as the master device. It is further appreciated that each of the multiple mobile devices 104A-N may function as a slave device. Each of the multiple mobile devices 104A-N comprises a battery, an application processor (AP), a low power personal area network (PAN) module, and a controller for the low power PAN module. For example, the mobile device 104A comprises a battery 106, an AP 108, and a low power personal area network (PAN) module 110 configured to communicate with the server 102 for establishing a connection with the server 102. It is appreciated that the low power PAN module may be a wireless IrDA, Bluetooth, UWB, Z-Wave and ZigBee which is designed to consume minimal amount of power. For example, a BT device with Bluetooth low energy (BLE) feature may consume a fraction (e.g., 1 to 5 percent) of the power of conventional BT device. It is further appreciated that the AP or application processor may be a system on chip (SoC) which include one or more of core (CPU), memory, display system/controller, multimedia en/decoding codec, 2D/3D accelerator engine, ISP (Image Signal Processor), camera, audio, modem, various high & low speed serial/parallel connectivity interface, etc.

The mobile device 104A further comprises a controller 112 for the low power PAN module 110 configured to process a connection request signal 114 from the server 102 and to wake up the AP 108 of the mobile device 104A in response to an AP on request signal 116 from the server 102 when the connection request signal 114 from the server 102 is verified as valid. The controller 112 is supplied with quiescent or insignificant current from the battery 106 of the mobile device 104A prior to the wake up of the AP 108. It is appreciated that each of the remaining mobile devices 104B-N comprises the same or equivalent features described in regard to the mobile device 104A.

In one embodiment, the server 102 comprises a PAN module 118 and a processor 120 configured to generate the connection request signal 114 and the AP on request signal 116. Alternatively, the PAN module 118 may be implemented as a dongle that can be freely attached or detached based on the need. In one exemplary implementation, the PAN module 118 of the server 102 comprises a Bluetooth (BT) device 122, and the low power PAN module 110 of the mobile device 104A comprises a BT device with BLE feature 124. The server 102 further comprises a memory 126 which stores a database (DB) 128 comprising addresses of Bluetooth devices with BLE feature (BD addresses) 130 for the mobile devices 104A-N and personal identification number (PIN) codes 132 designated for the mobile devices 104A-N, respectively. It is appreciated that the BD addresses 130 may store the network addresses of BT enabled devices, such as the devices 104A-N. The BD addresses 130 may be a unique number (e.g., in 48 bits) used to identify a particular device during operations such as connecting to, pairing with, or activating the device.

In one embodiment, a pairing of the server 102 and each of the mobile devices 104A-N is performed based on the BD addresses 130 and the PIN codes 132 designated for the mobile devices 104A-N. In one exemplary implementation, each of the PIN codes 132 may be a 4-digit personal ID code based on the serial number of the mobile device and/or the version of OS to be downloaded to the mobile device. The server 102 is configured to request the connection with the server 102 to each mobile device (e.g., the mobile device 104A) according to a particular profile dictated by the server 102, and each mobile device is configured to accept the request. In addition, the server 102 and each mobile device are configured to implement a protocol for the wake up of a corresponding AP (e.g., the AP 108).

Further, each mobile device is configured to perform the wake up of its AP upon receipt of its AP on request signal. The controller of each mobile device is configured to measure a level of its battery upon receipt of the AP on request signal, and the wake up of the AP is performed when the level of the battery is higher than a threshold level. For example, the controller 112 of the mobile device 104A is configured to measure the level of the battery 106 upon receipt of the AP on request signal 116, and the wake up of the AP 108 is performed when the level of the battery 106 is higher than a threshold level. In case the level of the battery 106 is lower than the threshold level, the mobile device may forward its status report to the server 102 without turning on the AP 108.

Further, the server 102 further comprises a Wi-Fi module 134, and each mobile device comprises a Wi-Fi module. For example, the mobile device 104A comprises a Wi-Fi module 136. In one embodiment, a download of an OS image 138 stored in the server 102 to each mobile device is performed via the Wi-Fi module 134 of the server 102 and the Wi-Fi module of each mobile device. In one exemplary implementation, the controller for the low power PAN module may be disabled when the download of the OS image is completed or the subject mobile device is in use.

Although the system 100 of FIG. 1 is described in terms of single server and each mobile device, it is appreciated that the process of connecting the mobile device 104A and performing a task remotely commanded by the server 102 may be simultaneously or serially performed for all of the mobile devices 104A-N. For example, if the low power PAN module in each mobile device is a BT device with BLE feature, the server 102, which is the master device, may form a piconet with seven slave devices, such as seven BT devices with BLE feature. Accordingly, the server 102 and the seven BT devices may communicate in serial or parallel to connect and wake up a corresponding AP of each mobile device. Alternatively, more than eight devices may be connected based on a scatternet so that the communication between the server 102 and the mobile devices can be performed in a rapid fashion.

Figure 2:
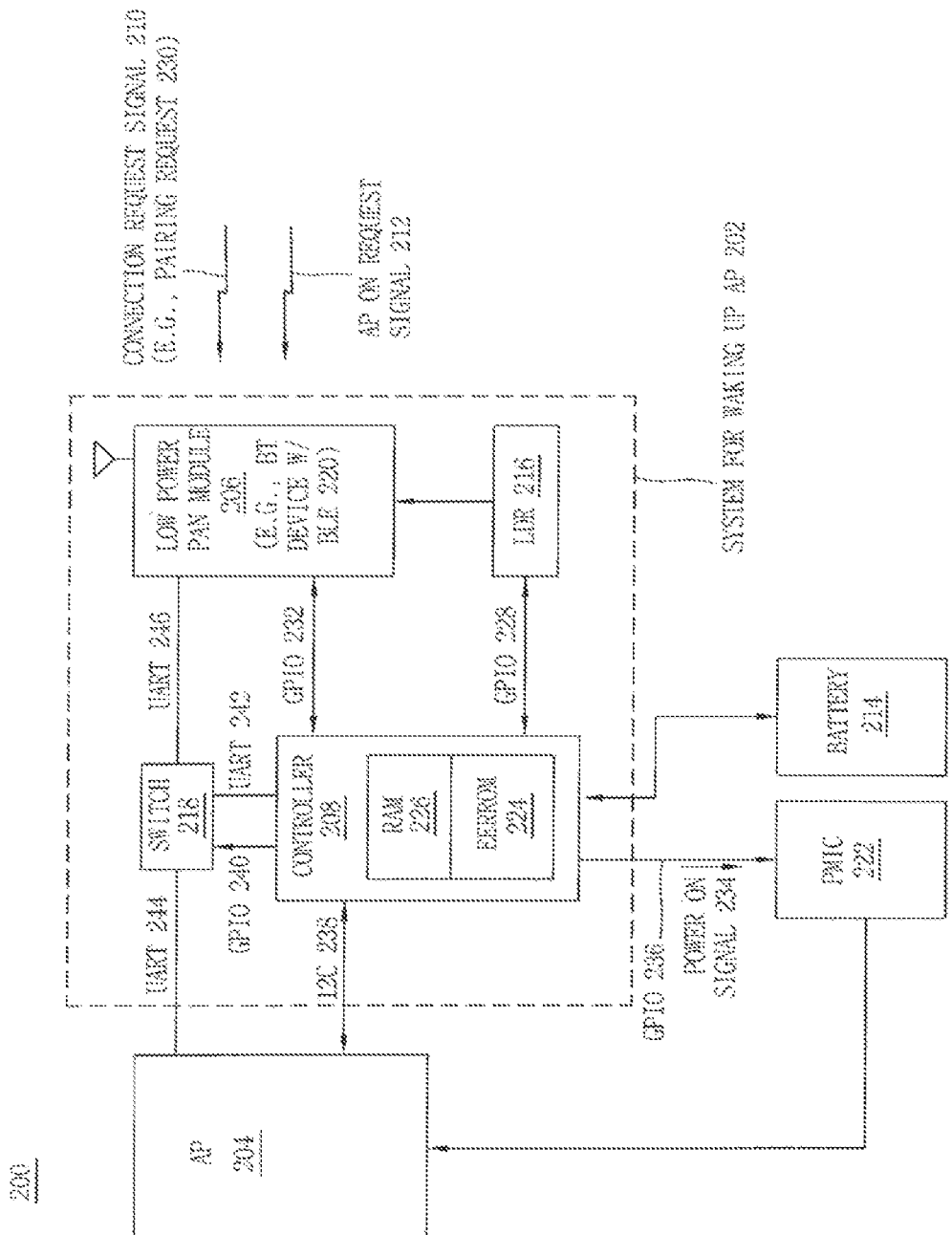
FIG. 2 illustrates an exemplary system for waking up an application processor (AP) of a mobile device, according to one embodiment.

FIG. 2 illustrates an exemplary system for waking up an application processor (AP) 202 of a mobile device 200, according to one embodiment. It is appreciated that the mobile device 200 is an exemplary embodiment of the mobile device 104A or any one of the mobile devices 104B-N in FIG. 1. In one embodiment, the system 202 comprises a low power personal area network (PAN) module 206 configured to communicate with an external device for establishing a connection with the external device. The system 202 further comprises a controller 208 for the low power PAN module 206 configured to process a connection request signal 210 from the external device and to wake up an AP 204 of the mobile device 200 in response to an AP on request signal 212 from the external device when the connection request signal 210 from the external device is verified as valid, where the controller 208 is supplied with quiescent current from a battery 214 of the mobile device 200 prior to the wake up of the AP 204.

The system 202 also comprises a low dropout regulator (LDO) 216 configured to maintain a voltage supplied to the low power PAN module 206. The system 202 further comprises a switch 218 configured to open a connection between the AP 204 and the low power PAN module 206 prior to the wake up of the AP 204 and to close the connection upon the wake up of the AP 204. In one exemplary implementation, the low power PAN module 206 comprises a Bluetooth device with BLE feature 220.

In one embodiment, the mobile device 200 comprises the battery 214, the AP 204, the low power PAN module 206, and the controller 208. The mobile device 200 further comprises the LDO 216, the switch 218, and a power management integrated circuit (PMIC) 222 configured to control a power supplied to the AP 204. It is appreciated that the mobile device 200 is an exemplary implementation of any one of the mobile devices 104A-N.

In one embodiment, the controller 208 is initialized when the battery 214 is installed to the mobile device 200. For example, during the initialization, the setting for general purpose input/outputs (GPIOs) of the controller 208 and the profile of the BT device with BLE feature 220 stored in EEPROM 224 of the controller 208 may be loaded to a RAM 226 of the controller 208. Further, the controller 208 is configured to perform a power on sequence of the Bluetooth device with BLE feature 220 by controlling the LDO 216 via a general purpose input/output (GPIO) 228 of the controller 208. The controller 208 is also configured to perform a pairing with the external device based on a pairing request 230 from the external device forwarded via a GPIO 232 of the controller 208. Prior to the powering up of the AP 204, the system for waking up AP 202 may be maintained with a quiescent current 248 supplied by the battery 214.

The controller 208 is further configured to forward a power on signal 234 via a GPIO 236 to the PMIC 222 to wake up the AP 204 in response to the AP on request signal 212 from the external device. Moreover, the controller 208 is configured to operate the switch 218 (e.g., using GPIO 240 and/or UART 242) to transfer a control of the Bluetooth device with BLE feature 220 to the AP 204. Subsequently, data is communicated directly between the AP 204 and the BT device with BLE feature 220. In one exemplary implementation, the controller 208 may be physically separate from the low power PAN module 206. In another exemplary implementation, the controller 208 may be a part of the low power PAN module 206 together with the LDO 216 and the switch 218. In yet another exemplary implementation, the controller 208 may be a part of the AP 204, yet islanded within the AP 204 so that the controller 208 can be operated without waking up the AP 204 prior to the receipt of the AP on request 212 from the external device.

Figure 3:
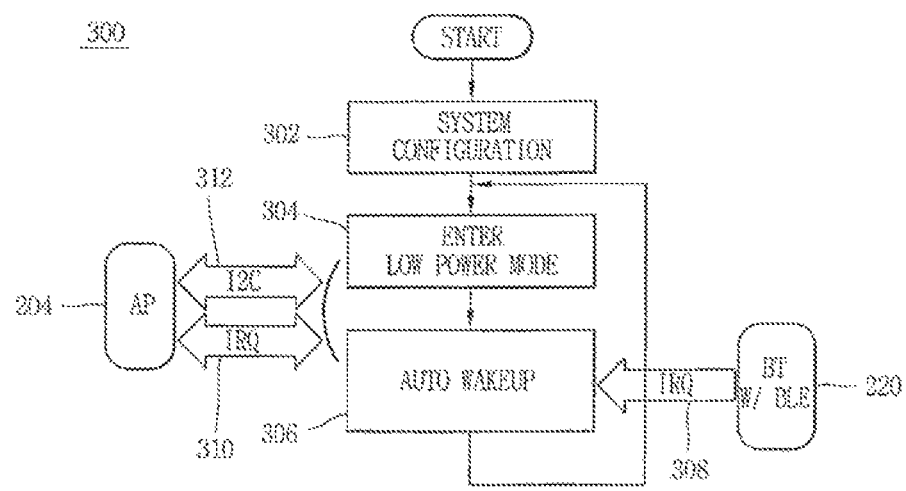
FIG. 3 illustrates a flow graph of an exemplary system for waking up an application processor of a mobile device, according one embodiment.

FIG. 3 illustrates an exemplary flow graph 300 of the system of the mobile device 200 in FIG. 2, according one embodiment. In operation 302, configurations of the system for waking up AP 202 are performed. It is appreciated that the system for waking up AP 202 may be a stand alone device (e.g., in a chip) or a part of the BT device with BLE feature 220 (e.g., or any other type of a low power PAN module). In addition, in operation 304, the system for waking up AP 202 enters a low power mode, where in one exemplary implementation, only 300 uA or less amount of current is drawn by the system for waking up AP 202. During the low power mode, the controller 208 of the system for waking up AP 202 monitors a signal from the BT device with BLE feature 220.

In operation 306, when an interrupt request (IRQ 308) is received from the BT with BLE feature 220, the controller 208 automatically wakes up the AP 204 via forwarding an interrupt request (IRQ 310) when authentication data forwarded from the BT with BLE feature 220 (e.g., as a part of a pairing request signal) is verified to be valid and an AP on request signal forwarded from the BT with BLE feature 220 is received and acknowledged by the controller 208. Then, the controller 208 communicates with the AP 204 via an inter-integrated circuit (12C 312) to transfer its control over the BT with BLE feature 220 to the AP 204.

Figure 4:
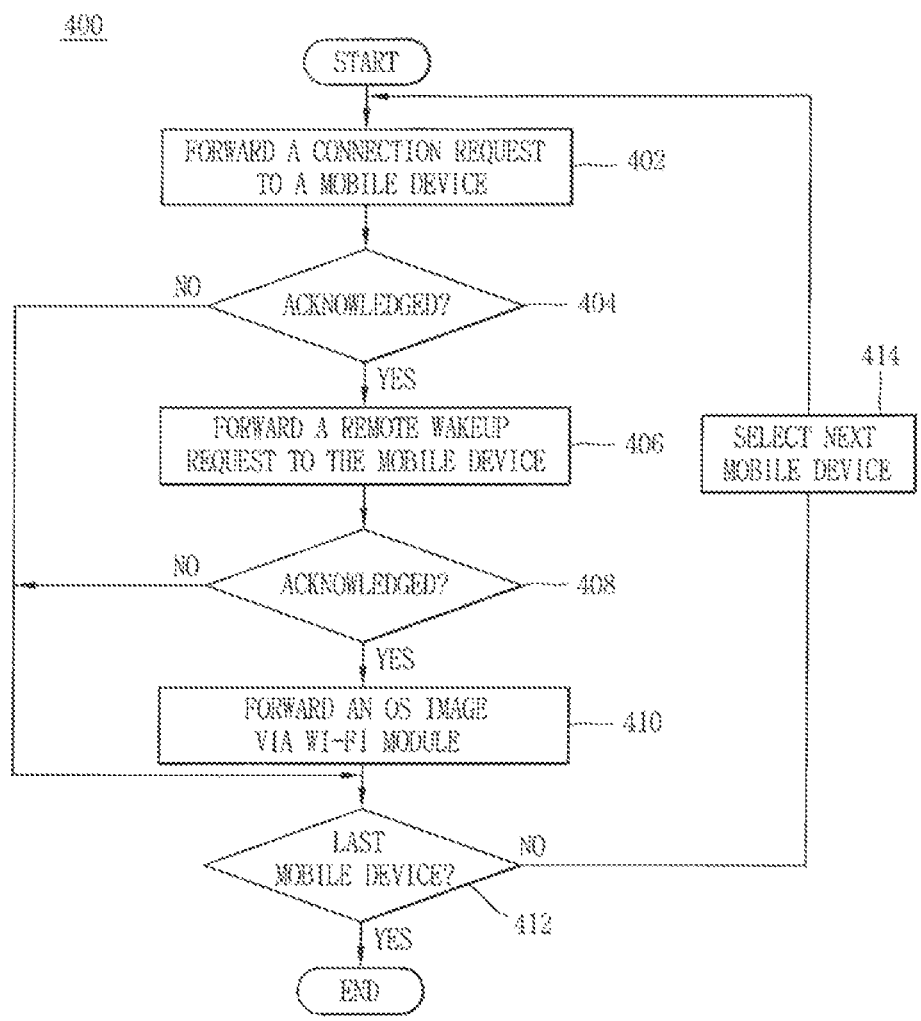
FIG. 4 illustrates a process flow chart of an exemplary method of a server for remotely waking up an application processor of a mobile device, according to one embodiment.

FIG. 4 illustrates a process flow chart 400 of an exemplary method of a server for remotely waking up an application processor of a mobile device, according to one embodiment. In keeping with the previous examples, particular components described with respect to FIG. 1 are referenced as performing the process in FIG. 4. It should be noted that the components that are referred to as performing the process are for illustrative purposes only. In some implementations, other components, or a different combination of components within a system, may instead perform the process in FIG. 4.

In operation 402, as illustrated in FIG. 1, the connection request signal 114 (e.g., a pairing request) is forwarded to the mobile device 104A via the PAN module 118 (e.g., the BT device 122). If the connection request signal 114 (e.g., a pairing request signal) is not acknowledged by the mobile device 104A in operation 404, the connection request signal 114 is sent to next mobile device (e.g., the mobile device 104B) unless the present mobile device is the last one. If the connection request signal 114 (e.g., the pairing request signal) is acknowledged by the mobile device 104A in operation 404, the server 102 forwards a remote wakeup request signal (e.g., the AP on request signal 116) to the mobile device 104A in operation 406. If the remote wakeup request signal is not acknowledged by the mobile device 104A in operation 408, the remote wakeup request signal is sent to next mobile device (e.g., the mobile device 1048) unless the present mobile device is the last one.

If the remote wakeup request signal is acknowledged by the mobile device 104A in operation 408, the OS image 138 is forwarded to the mobile device 104A using the Wi-Fi module 134. If the present mobile device is determined as the last mobile device (e.g., the mobile device 104N), the operation of waking up each mobile device and performing the download of the OS image 138 are brought to end. Otherwise, operations 402 through 410 are repeated once next mobile device is selected in operation 414.

It is appreciated that the methods disclosed in FIG. 4 may be implemented in a form of a machine-readable medium embodying a set of instructions that, when executed by a machine, cause the machine to perform any of the operations disclosed herein.

Figure 5:
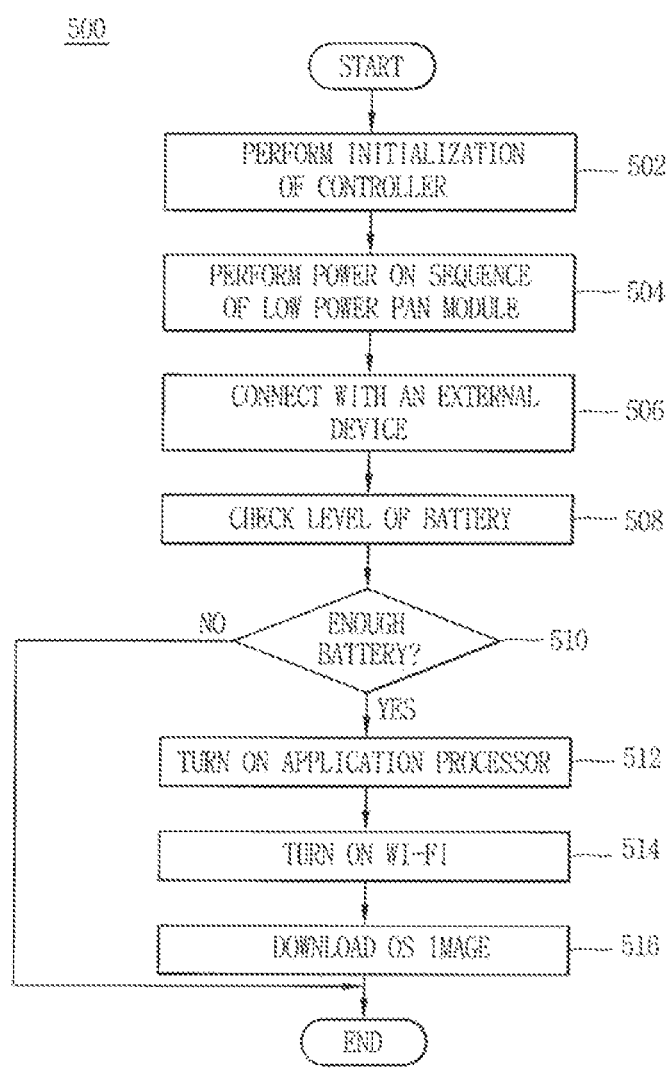
FIG. 5 illustrates a process flow chart of an exemplary method of a mobile device for waking up an application processor of a mobile device, according to one embodiment.

FIG. 5 illustrates a process flow chart 500 of an exemplary method of a mobile device for waking up an application processor of the mobile device, according to one embodiment. In keeping with the previous examples, particular components described with respect to FIG. 2 are referenced as performing the process in FIG. 5. It should be noted that the components that are referred to as performing the process are for illustrative purposes only. In some implementations, other components, or a different combination of components within a system or device, may instead perform the process in FIG. 5.

In operation 502, as illustrated in FIG. 2, the initialization of the controller 208 is performed as the battery 214 (e.g., fully charged) is installed on the mobile device 200. Then, in operation 504, the power on sequence of the low power PAN module 206 is performed. From this on, until the AP 204 is turned on by a request from an external device, the controller 208 as well as the low power PAN module 206 remains in standby mode, thus consuming minimal amount of power from the battery 214. This way, a mobile device (e.g., the mobile device 200) in package can be configured to attune to a wake up signal (e.g., the connection request signal 210 and the AP on request signal 212) from an external device (e.g., the server 102) while consuming minimal amount of power to maintain the monitoring and controlling system and/or device (e.g. the system for waking up AP 202) in standby mode. As the low power PAN module 206 as well as the controller 208 can be maintained using quiescent current from the battery 214, the monitoring and controlling system and/or device may be maintained for many months without any recharging.

When the system for waking up AP 202 is in standby mode in operation 506, the mobile device 200 may connect with the external device when the connection request signal 210 is verified. In operation 508, upon receipt of the AP on request signal 212 from the external device, the level of the battery 214 is checked. If there isn't enough battery required to perform a single task satisfactorily, the mobile device 200 may refrain from acknowledging the external device in response to the AP on request signal 212 and ends the process illustrated in FIG. 5 for the mobile device 200. On the other hand, if there is enough battery in operation 510, the AP 204 of the mobile device 200 is turned on in operation 512.

Then, in operation 514, the AP 204 turns on the Wi-Fi module 136 of FIG. 1 to process data transferred from the external device. The Wi-Fi module 136 (e.g., and/or the Wi-Fi module 134 for the server 102) is selected to transfer large files or large amount of data since Wi-Fi is more equipped to transfer data faster and in farther distance. In operation 516, the OS image 138 is downloaded from the external device to the mobile device 200, thus completing the process. Once the download of the OS image 138 (e.g., or any other task such as remotely running an application) is completed, the AP 204 of the mobile device 200 may be turned off and the system for waking up AP 202 may return to the standby mode until there is another wakeup of the AP 204 or the mobile device 200 is in operation.

It is appreciated that the methods disclosed in FIG. 5 may be implemented in a form of a machine-readable medium embodying a set of instructions that, when executed by a machine, cause the machine to perform any of the operations disclosed herein.

Figure 6:
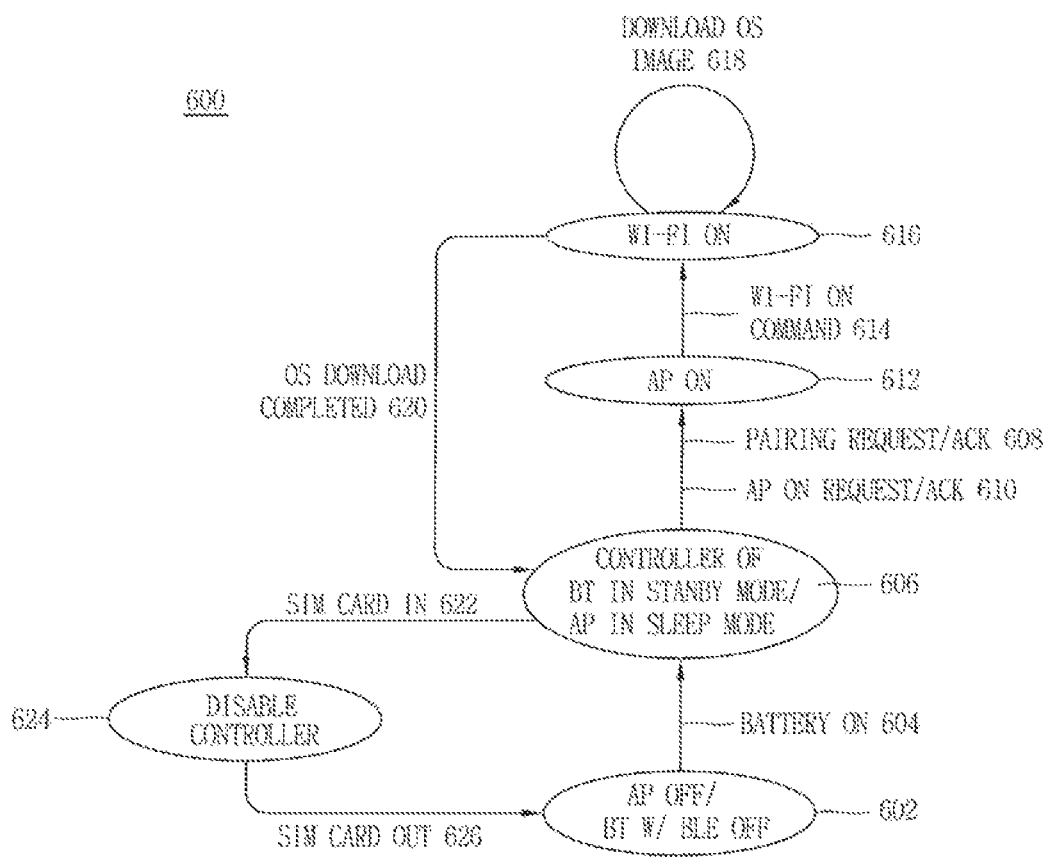
FIG. 6 is a state diagram which illustrates various states of an exemplary mobile device configured for waking up an application processor of a mobile device, according to one embodiment.

FIG. 6 is a state diagram 600 which illustrates various states of an exemplary mobile device configured for waking up an application processor of the mobile device, according to one embodiment. In keeping with the previous examples, particular components in FIG. 1 are referenced to describe the state diagram 600 in FIG. 6. It should be noted that the components that are referred are for illustrative purposes only. In some implementations, other components, or a different combination of components within a system or device, may be used to illustrate the state diagram 600 in FIG. 6.

In FIG. 6, AP OFF/BT W/BLE OFF state 602 is where the mobile device 104A or any one of the mobile devices 104A-N in FIG. 1 is without any power source (e.g., the battery 106). As the battery 106 is inserted to the mobile device 104A, as illustrated in 'battery on' 604 during the packaging process of the mobile device 200, the controller 112 and/or the BT device with BLE feature 124 of the mobile device 104A are switched to the standby mode, where the controller 112 is configured to remain alert for a signal from an external device. During CONTROLLER OF BT W/BLE IN STANDBY MODE/AP IN SLEEP MODE state 606, the AP 108 remains in sleep state, thus drawing minimal amount power from the battery 106. This way, the controller 112 of the BT device with BLE feature can remain in the standby mode (e.g., several months) with just quiescent current supplied from the battery 106.

Then, upon the processing of the pairing request and the AP on request, as in 'pairing request/ack' 608 and 'AP on request/ack' 610, the state of the mobile device 104A is moved to AP ON state 612. In the AP ON state 612, the AP 108 of the mobile device 104A is turned on, and the AP 108 takes over the control of the BT device with BLE feature 124. Then, the AP 108 issues a 'Wi-Fi on command' 614 to turn the Wi-Fi module 136, thus arriving at WI-FI ON state 616. When the mobile device 104A is in the Wi-Fi ON state 616, the download of the OS image 138 from the server 102 is performed, as illustrated in step 'download OS image' 618. Further, as the download of the OS image 138 is completed in 620 COS download completed), the state of the mobile device 104A returns to the CONTROLLER OF BT W/BLE IN STANDBY MODE/AP IN SLEEP MODE state 606, where the controller 112 is in the standby mode while the AP 108 is in sleep or deep sleep mode. Then, as the mobile device 104A is brought out from its package and accessed by a user, as 'SIM card in' 622 indicates, the state of the mobile device 104A is transformed to DISABLE CONTROLLER STATE 624, where the controller 112 is disabled in order to prevent the user to temper with the mobile device 200. Further, as the SIM card is brought out as the mobile device 104A is in for service, as indicated in 'SIM card out' 626, the state of the mobile device 104A changes to the AP OFF/BT W/BLE OFF state 602.

Figure 7:
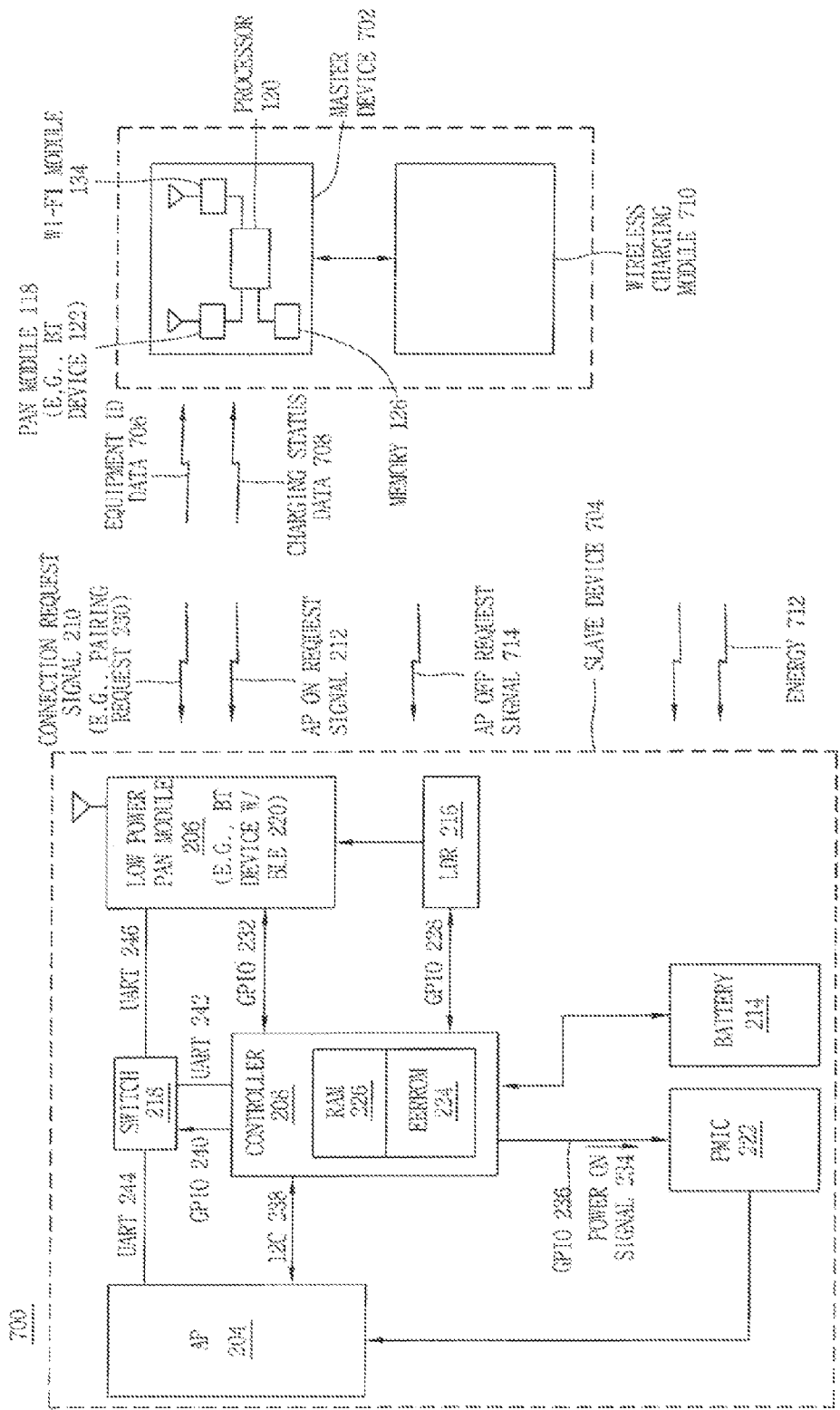
FIG. 7 illustrates an exemplary system of a master device for wireless charging a slave device, according to one embodiment.

FIG. 7 illustrates an exemplary system 700 of a master device 702 for wireless charging a slave device 704, according to one embodiment. In FIG. 7, the master device 702 comprises the PAN module 118 (e.g., the BT device 122), the processor 120, the memory 126, and the WI-FI module 134. It is appreciated that the components constituting the master device 702 are similar to those components of the server 102 featured in FIG. 1. In one embodiment, the memory 126 comprises a set of instructions, when executed by the processor 120, performs a method comprising forwarding a first connection request signal (e.g., the connection request signal 210) to the slave device 704 to wake up the AP 204 of the slave device 704, where the slave device 712 is supplied with quiescent current from the battery 214 of the slave device 704 prior to the wake up of the AP 204.

The method also comprises receiving (e.g., periodically) a first equipment identity (ID) data 706 of the slave device 704 and a charging status data 708 of the battery 214, and wirelessly transferring a first amount of energy 712 using a wireless charging module 710 associated with the master device 702 to charge the slave device 704 based on the first equipment identity data 706 and the charging status data 708. The method further comprises generating a signal to terminate the charging of the battery 214 when the charging status data 708 indicates that a level of the battery 214 has reached a threshold. Moreover, the method comprises forwarding an AP OFF request signal 714 to place the AP 204 back to sleep when the level of the battery 214 reaches the threshold.

Further, as illustrated in FIG. 7, the slave device 704 (e.g., a mobile device such as a mobile phone) comprises the AP 204, the low power PAN module 206 (e.g., the BT device with BLE feature 220), the controller 208, the battery 214, the LDR 216, the switch 218, the PMIC 222, the EEPROM 224, and the RAM 226. It is appreciated that the components in the salve device 704 operate in a similar manner to those illustrated in FIG. 2. Further, in one embodiment, a system for wirelessly charging a mobile device comprises the low power PAN module 206 configured to wirelessly communicate with the master device 702 for establishing a connection with the master device 702. The system also comprises the controller 208 for the low power PAN module 206 configured to monitor the connection request signal 210 communicated from the master device 702 via the low power PAN module 206 while the slave device 704 is or remains in a sleep mode, where the controller 208 is supplied with quiescent current from the battery 214 of the slave device 704 during the sleep mode. The system further comprises the AP 204 configured to wake up from the sleep mode when the connection request signal 210 is validated by the controller 208, forward to the master device 702 the equipment identity data 706 of the slave device 704 and the charging status data 708 of the battery 214, and charge the battery 214 of the slave device 704 with the energy 712 received from the wireless charging module 710 associated with the master device 702.

In one exemplary implementation, the low power PAN module 206 comprises a Bluetooth device with Bluetooth low energy (BLE) feature 220 or a BLE device. In one exemplary implementation, the master device 702 is a server, a laptop computer, a desktop computer, or a mobile phone. In one exemplary implementation, the equipment identity data 706 comprises an international mobile equipment ID (IMEI). In one exemplary implementation, the wireless charging module 710 is configured to turn on or off in response to a signal forwarded by the master device 702 coupled to the wireless charging module 710 wirelessly or in a wired fashion.

It is appreciated that the wireless charging module 710 is configured to perform an inductive charging, a radio charging, a resonance charging, or other type of charging. It is well known to those skilled in the art that the inductive charging is used for charging mid-sized items, such as cell phones, MP3 players, PDAs, etc, that the radio charging is used for charging small batteries and low power requirements, such as watches, hearing aids, medical implants, cell phones, MP3 players, wireless keyboard and mice, etc., and that the resonance charging is used for items that require large amounts of power, such as an electric car, robot, vacuum cleaner, laptop computer, etc. In the resonance charging, a copper coil of a resonant frequency attached to the power source is the sending unit (e.g., the wireless charging module 710 associated with the master device 702), whereas another coil of the same resonant frequency attached to the device (e.g., implemented in the slave device 704) to be charged is the receiver. Thus, when the coil of the wireless charging module 710 is placed close to the coil of the slave device 704, the both coils are tuned to the same electromagnetic frequency, and the wireless charging module is turned on to charge the slave device 704, the energy 712 is produced.

Figure 8:
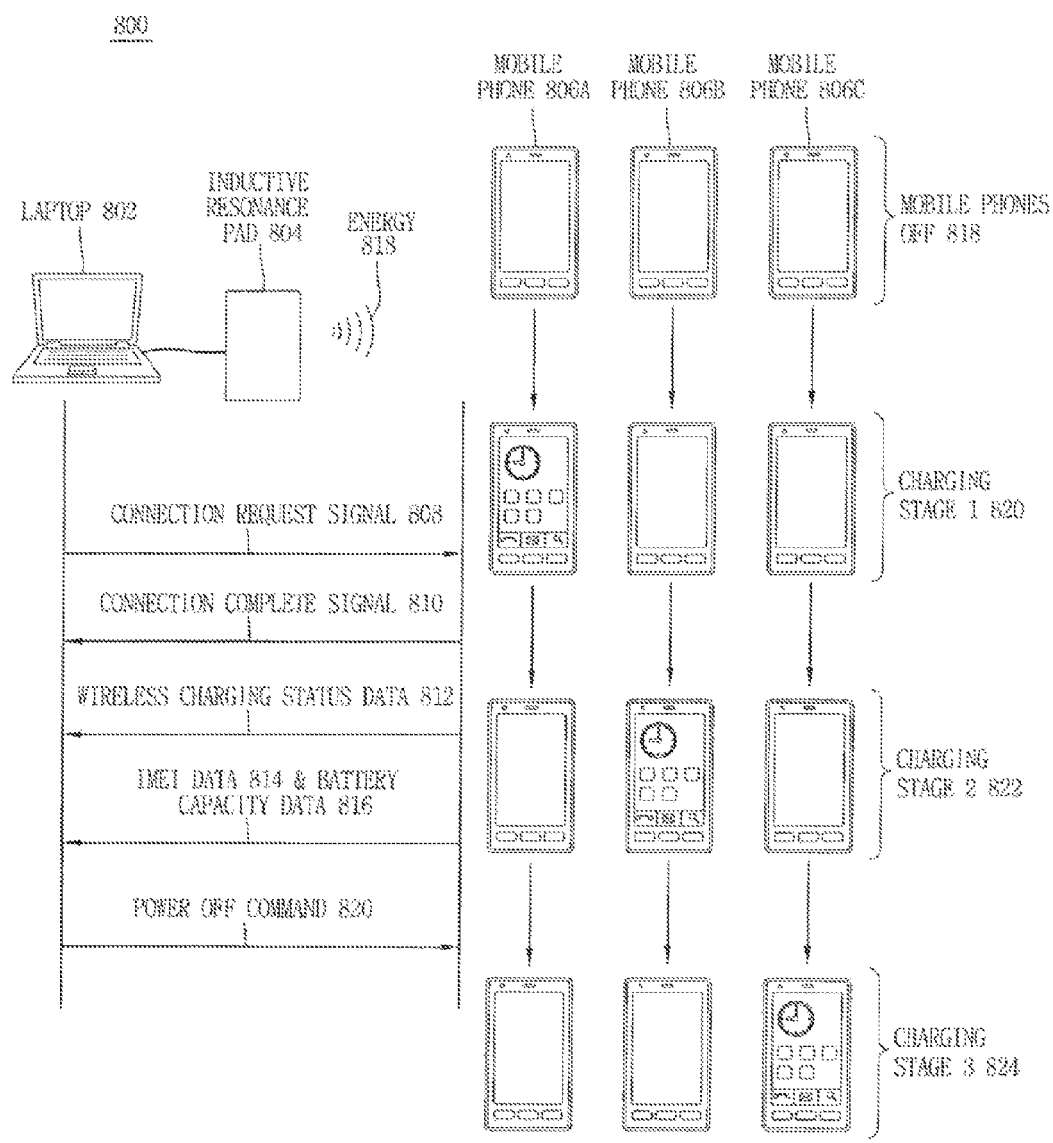
FIG. 8 illustrates an exemplary signal flow graph for wireless charging multiple mobile phones, according to one embodiment.

FIG. 8 illustrates an exemplary signal flow graph 800 for wireless charging multiple mobile phones 806A-C, according to one embodiment. FIG. 8 illustrates a laptop 802 operating an inductive resonance pad 804 to serially charge the multiple mobile phones 806A-C. It is appreciated that the laptop 802 is an exemplary implementation of the master device 702 of FIG. 7, the inductive resonance pad 804 an exemplary implementation of the wireless charging module 710, and each of the mobile devices 806A-C an exemplary implementation of the slave device 704.

In FIG. 8, initially, the mobile phones 806A-C are in an off state as illustrated in mobile phones off 818. Then, during a charging stage 1 820, a connection request signal 808 is generated and forwarded by the laptop 802. The mobile phone 806A is turned on when the connection request signal 808 is verified by the mobile phone 806A when the attempt for the connection becomes successful. A connection complete signal 810 is forwarded from the mobile phone 806A. Once the connection is established between the laptop 802 and the mobile phone 806A, a wireless charging status data 812, an IMEI data 814, and a battery capacity data 816 are forwarded by the mobile phone 806A, thus prompting the laptop 802 to charge the mobile phone 806A using the inductive resonance pad 804. For example, when the battery capacity data 816 of 5 Watt-hour and the wireless charging status data 812 of 20% are forwarded to the mobile phone 806A based on the IMEI data 814 of the mobile phone 806A, the laptop 802 may operate the inductive resonance pad 804 to supply at least 80% of the energy 818 to fully charge the battery of the mobile phone 806A. In an alternative implementation, the energy 810 may be transferred from the inductive resonance pad 804 to the mobile phone 806A based on a threshold value. For instance. The threshold of 80% may be set so that the capacity of the battery of the mobile phone 806A is charged to 80% of its full capacity.

Once the mobile phone 806A is charged to its capacity or a target threshold, the laptop 802 forwards a power off command 820 to stop the charging and turn off the mobile phone 806A, thus completing the charging stage 1 820. Subsequently, during a charging stage 2 822, the mobile phone 806B is charged based on the procedure illustrated in the signal flow graph 800 of FIG. 8. In one exemplary implementation, the mobile phone 806B may be charged to 60% of its full capacity. Following the completion of the charging of the mobile phone 806B, during a charging stage 3 824, the mobile phone 806C is charged based on the procedure illustrated in the signal flow graph 800. In one exemplary implementation, the mobile phone may be charged to 90% of its full capacity. Thus, through serially charging the mobile phones 806A-C, a single charging device, such as the inductive resonance pad 804, can be used to charge a multiple number of the devices.

Figure 9:
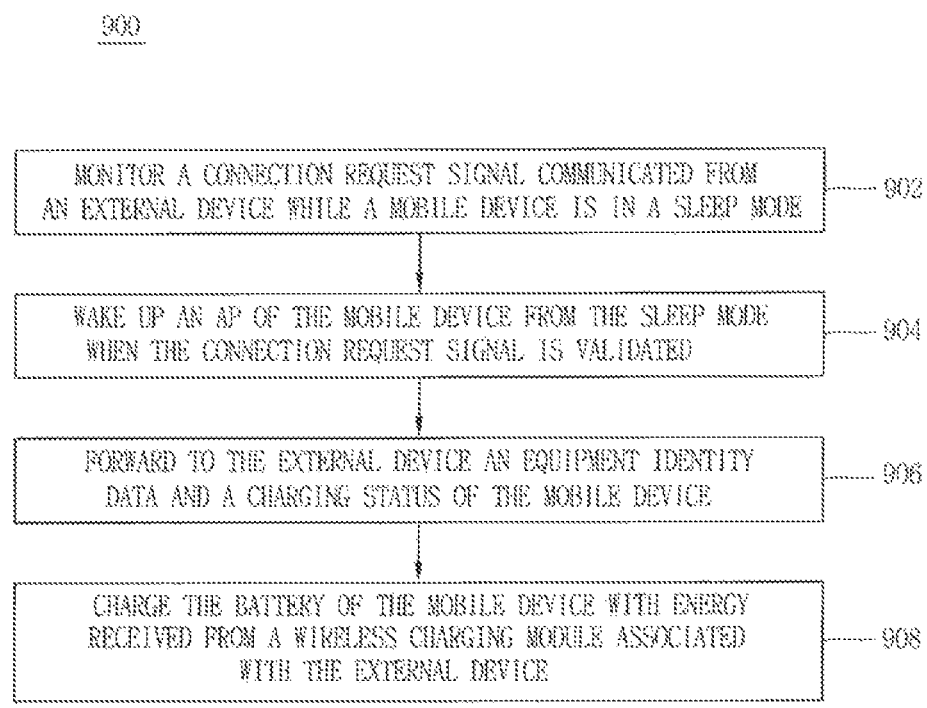
FIG. 9 illustrates a process flow chart of an exemplary method for wirelessly charging a mobile device, according to one embodiment.

FIG. 9 illustrates a process flow chart 900 of an exemplary method for wirelessly charging a mobile device, according to one embodiment. In keeping with the previous examples, particular components described with respect to FIG. 7 are referenced as performing the process in FIG. 9. It should be noted that the components that are referred to as performing the process are for illustrative purposes only. In some implementations, other components, or a different combination of components within a system or device, may instead perform the process in FIG. 9.

In operation 902, as illustrated in FIG. 7, the connection request signal communicated from an external device (e.g., the master device 702) is monitored using the controller 208 of a mobile device (e.g., the slave device 704) via the low power PAN module 206 of the mobile device while the mobile device is in a sleep mode, where the controller 208 is supplied with quiescent current from the battery 214 of the mobile device during the sleep mode. In operation 904, the AP 204 of the mobile device is awoken from the sleep mode when the connection request signal 210 is validated by the controller 208. In operation 906, the equipment ID data 706 of the mobile device and the charging status data 708 of the battery 214 are forwarded to the external device. In operation 908, the battery 214 of the mobile device is charged with the energy 712 received from the wireless charging module 710 associated with the external device.

In a further operation, the charging of the battery 214 may be terminated when a level of the battery 214 reaches a threshold. In another further operation, the AP OFF request signal 714 may be generated to place the AP 204 back to the sleep mode when the charging of the battery 214 is completed. It is appreciated that the methods disclosed in FIG. 9 may be implemented in a form of a machine-readable medium embodying a set of instructions that, when executed by a machine, cause the machine to perform any of the operations disclosed herein.

FIG. 10 illustrates a process flow chart 1000 of an exemplary method of a master device (e.g., the laptop 802) for wirelessly charging a slave device, according to one embodiment. In keeping with the previous examples, particular components described with respect to FIG. 8 are referenced as performing the process in FIG. 10. It should be noted that the components that are referred to as performing the process are for illustrative purposes only. In some implementations, other components, or a different combination of components within a system or device, may instead perform the process in FIG. 10.

In operation 1002, as illustrated in FIG. 8, a first connection request signal (e.g., the connect request signal 808) is forwarded to a first slave device (e.g., the mobile device 806A) of the plurality of slave devices (e.g., the mobile devices 806A-C) to wake up a first AP of the first slave device, where the first slave device is supplied with quiescent current from a first battery of the first slave device prior to the wake up of the first AP. In operation 1004, a first equipment identity data (e.g., the IMEI data 814) of the first slave device and a first charging status (e.g., the wireless charging status data 812) of the first battery are received. In operation 1006, a first amount of energy is wirelessly transferred using a wireless charging module (e.g., the inductive resonance pad 804) associated with the master device to charge the first slave device based on the first equipment identity data and the first charging status. In one embodiment, a first termination signal to terminate the charging of the first battery is forwarded when the first charging status indicates that a level of the first battery has reached a first threshold (e.g., 80% of the battery's full capacity). In another embodiment, a first AP OFF request signal (e.g., the power off command 820) is forwarded to place the first AP to sleep when the level of the first battery reaches the first threshold.

In operation 1008, a second connection request signal is forwarded to a second slave device (e.g., the mobile device 806B) of the plurality of slave devices to wake up a second AP of the second slave device, wherein the second slave device supplied with quiescent current from a second battery of the second slave device prior to the wake up of the second AP. In operation 1010, a second equipment identity data of the second slave device and a second charging status of the second battery are received. In operation 1012, a second amount of energy is wirelessly transferred using the wireless charging module to charge the second slave device based on the second equipment identity data and the second charging status.

In one embodiment, a second termination signal to terminate the charging of the second battery is forwarded when the second charging status indicates that a level of the second battery has reached a second threshold (e.g., 60% of the battery's full capacity). In another embodiment, a second AP OFF signal is forwarded to place the second AP to sleep when the level of the second battery reaches the second threshold.

It is appreciated that the methods disclosed in FIG. 10 may be implemented in a form of a machine-readable medium embodying a set of instructions that, when executed by a machine, cause the machine to perform any of the operations disclosed herein.

In various embodiments, the systems, circuits, devices, and methods described in FIGS. 1-10 may enable charging of a mobile device in a more efficient way as long as the mobile device has enough battery power to operate a system for waking up the AP in the sleep mode as described earlier. Further, according to the various embodiments of the present disclosure, a single wireless charging module may be used to charge multiple mobile devices. In one exemplary implementation, a master device controlling the wireless charging module (e.g., the inductive resonance pad) may be operated to serially charge multiple mobile devices by waking up the mobile devices one at a time, receiving the equipment ID, the charging status data, and/or the battery capacity data of the mobile devices, and charging the mobile devices according to the order they are turned on. Thus, the automatic and efficient charging system and method may provide a more efficient and cost effective way of maintaining the mobile devices. Thus, the various embodiments disclosed in the present disclosure provide more versatile, efficient methods, systems and devices for wirelessly charging mobile devices.

The various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). Further, the various electrical structure and methods may be embodied using transistors, logic gates, and/or electrical circuits (e.g., application specific integrated circuit (ASIC)). Although the present embodiments have been described with reference to specific example embodiments, it will be evident that various modifications and changes may be made to these embodiments without departing from the broader spirit and scope of the various embodiments.

What is claimed is:

1. A mobile device, comprising:
a battery;
a low power personal area network (PAN) module configured to wirelessly communicate with an external device for establishing a connection with the external device;
a controller for the low power PAN module configured to monitor a connection request signal communicated from the external device via the low power PAN module while the mobile device is in a sleep mode, wherein the controller is supplied with quiescent current from the battery of the mobile device during the sleep mode;
an application processor (AP) configured to:
wake up from the sleep mode when the connection request signal is validated by the controller;
forward to the external device an equipment identity data of the mobile device and a charging status of the battery; and
charge the battery with energy received from a wireless charging module associated with the external device; and
a switch physically coupled to the controller, the low power PAN module, and the AP,
wherein the switch is controlled by the controller to break a connection between the low power PAN module and the AP prior to the wake up of the AP and to establish the connection between the low power PAN module and the AP upon the wake up of the AP such that the equipment identity data and the charging status are communicated directly from the AP to the low power PAN module without being routed via the controller upon the wake up of the AP.

2. The mobile device of claim 1, wherein the low power PAN module is a Bluetooth device with Bluetooth low energy (BLE) feature or a BLE device.

3. The mobile device of claim 1, wherein the external device is a server, a laptop computer, a desktop computer, or a mobile phone.

4. The mobile device of claim 1, wherein the equipment identity data comprises an international mobile equipment ID.

5. The mobile device of claim 1, wherein the wireless charging module is configured to turn on or off in response to a signal forwarded by the external device.

6. The mobile device of claim 5, wherein the wireless charging module is configured to perform inductive resonance charging.

7. A method for wirelessly charging a battery of a mobile device by the mobile device, the method comprising:
monitoring, by a controller of the mobile device, a connection request signal communicated from an external device via a low power personal area network (PAN) module of the mobile device while the mobile device is in a sleep mode, wherein the controller is supplied with quiescent current from the battery during the sleep mode;
waking up an application processor (AP) of the mobile device from the sleep mode when the connection request signal is validated by the controller, wherein the mobile device comprises a switch that is physically coupled to the controller, the low power PAN module, and the AP, and wherein the switch controlled by the controller is configured to break a connection between the low power PAN module and the AP prior to the wake up of the AP and to establish the connection between the low power PAN module and the AP upon the wake up of the AP;
forwarding to the external device an equipment identity data of the mobile device and a charging status of the battery, wherein the equipment identity data and the charging status are communicated directly from the AP to the low power PAN module, without being routed via the controller, upon the wake up of the AP; and
charging the battery with energy received from a wireless charging module associated with the external device.

8. The method of claim 7, further comprising terminating the charging of the battery when a level of the battery reaches a threshold.

9. The method of claim 8, further comprising generating an AP OFF signal to place the AP back to the sleep mode when the charging of the battery is completed.

10. The method of claim 7, wherein the low power PAN module is a Bluetooth device with Bluetooth low energy (BLE) feature or a BLE device.

11. The method of claim 7, wherein the equipment identity data comprises an international mobile equipment ID.

12. The method of claim 7, wherein the wireless charging module is configured to perform inductive resonance charging.

13. A method for charging a battery of a respective plurality of slave devices by a master device, the method comprising:
forwarding a first connection request signal to a first slave device of the plurality of slave devices to wake up a first application processor (AP) of the first slave device, wherein a first controller for a first low power personal area network (PAN) module of the first slave device is supplied with quiescent current from a first battery of the first slave device prior to the wake up of the first AP to control the first low power PAN module prior to the wake up of the first AP, wherein a first switch of the first slave device is physically coupled to the first controller, the first low power PAN module, and the first AP, and wherein the first switch controlled by the first controller is configured to break a connection between the first low power PAN module and the first AP prior to the wake up of the first AP and to establish the connection between the first low power PAN module and the first AP upon the wake up of the first AP;
receiving a first equipment identity data of the first slave device and a first charging status of the first battery, wherein the first equipment identity data and the first charging status are communicated directly from the first AP to the first low power PAN module without being routed via the first controller upon the wake up of the first AP; and
wirelessly transferring a first amount of energy using a wireless charging module associated with the master device to charge the first battery based on the first equipment identity data and the first charging status.

14. The method of claim 13, further comprising forwarding a first termination signal to terminate the charging of the first battery when the first charging status indicates that a level of the first battery has reached a first threshold.

15. The method of claim 14, further comprising forwarding a first AP OFF request signal to place the first AP to sleep when the level of the first battery reaches the first threshold.

16. The method of claim 15, further comprising:
forwarding a second connection request signal to a second slave device of the plurality of slave devices to wake up a second AP of the second slave device, wherein a second controller for a second low power PAN module of the second slave device is supplied with quiescent current from a second battery of the second slave device prior to the wake up of the second AP to control the second low power PAN module prior to the wake up of the second AP, wherein a second switch of the second slave device is physically coupled to the second controller, the second low power PAN module, and the second AP, and wherein the second switch controlled by the second controller is configured to break a connection between the second low power PAN module and the second AP prior to the wake up of the second AP and to establish the connection between the second low power PAN module and the second AP upon the wake up of the second AP;
receiving a second equipment identity data of the second slave device and a second charging status of the second battery, wherein the second equipment identity data and the second charging status are communicated directly from the second AP to the second low power PAN module without being routed via the second controller upon the wake up of the second AP; and
wirelessly transferring a second amount of energy using the wireless charging module to charge the second battery based on the second equipment identity data and the second charging status.

17. The method of claim 16, further comprising forwarding a second termination signal to terminate the charging of the second battery when the second charging status indicates that a level of the second battery has reached a second threshold.

18. The method of claim 17, further comprising forwarding a second AP OFF signal to place the second AP to sleep when the level of the second battery reaches the second threshold.

19. The method of claim 13, wherein each of the plurality of slave devices comprises a mobile device with an embedded battery.

* * * * *